US012605719B2

(12) United States Patent
Greulich et al.

(10) Patent No.: US 12,605,719 B2
(45) Date of Patent: Apr. 21, 2026

(54) METHODS AND COMPOSITIONS FOR PROCESSING SULFIDE ORES

(71) Applicant: Ecolab USA Inc., St. Paul, MN (US)

(72) Inventors: Christopher Ryan Greulich, Tucson, AZ (US); Kevin O'Brien, Saint Charles, IL (US); Michael Ignazio LaRosa, Palacios, TX (US)

(73) Assignee: Ecolab USA Inc., St. Paul, MN (US)

( * ) Notice: Subject to any disclaimer, the term of this patent is extended or adjusted under 35 U.S.C. 154(b) by 349 days.

(21) Appl. No.: 17/410,220

(22) Filed: Aug. 24, 2021

(65) Prior Publication Data

US 2022/0062919 A1 Mar. 3, 2022

Related U.S. Application Data

(60) Provisional application No. 63/070,629, filed on Aug. 26, 2020.

(51) Int. Cl.
*B03D 1/02* (2006.01)
*B03D 1/012* (2006.01)

(52) U.S. Cl.
CPC ............... *B03D 1/02* (2013.01); *B03D 1/012* (2013.01); *B03D 2203/02* (2013.01)

(58) Field of Classification Search
CPC .... B03D 1/02; B03D 1/012; B03D 2201/002; B03D 1/0043; B03D 2203/02; B03D 1/016; B03D 1/008; B03D 1/01; B03D 2201/06; B03D 2203/006; B03D 2203/025; B03D 1/0046; B03D 2201/02; B03D 3/06; B03D 1/014; B03D 1/08; B03D 2201/007; B03D 1/021; B03D 2203/08; B03D 1/002;
(Continued)

(56) References Cited

U.S. PATENT DOCUMENTS 4,097,390 A 6/1978 Wang et al.
4,156,649 A * 5/1979 Quinn .................... B01D 37/03
252/60
(Continued)

FOREIGN PATENT DOCUMENTS

GB 824661 A 12/1959
GB 2163976 B 9/1988
(Continued)

OTHER PUBLICATIONS

Advanced Turbulent Drag Reducing and Flocculating Materials Based on Polysaccharides ('Singh', Polymers and Other Advanced Materials: Emerging Technologies and Business Opportunities. Edited by P. N. Prasad et al., Plenum Press, New York, 1995) (Year: 1995).*

(Continued)

*Primary Examiner* — Bobby Ramdhanie
*Assistant Examiner* — Boi-Lien Thi Nguyen
(74) *Attorney, Agent, or Firm* — Kagan Binder, PLLC

(57) ABSTRACT

Described herein are methods of reducing the viscosity of products of sulfide ore froth flotation. A froth overflow, or an underflow of sulfide ore flotation is treated using a nonionic compound to reduce the viscosity of a froth or an underflow. The lowered viscosity imparts several benefits in sulfide ore processing of copper and molybdenum metal products, including increased rate of sedimentation to yield a concentrated product.

14 Claims, 2 Drawing Sheets

(58) Field of Classification Search
CPC .......... B03D 1/018; B03D 1/06; B03D 1/082; B03D 1/1406; B03D 1/1431; B03D 2201/005; B03D 2203/04; B03D 2203/06; B03D 1/006; B03D 1/025; B03D 1/028; B03D 1/14; B03D 1/1456; B03D 1/1462; B03D 1/1468; B03D 1/1475; B03D 1/1493; B03D 1/16; B03D 1/24; B03D 1/247; C02F 11/147; C02F 2305/04
See application file for complete search history.

(56) References Cited

U.S. PATENT DOCUMENTS

| | | | | |
|---|---|---|---|---|
| 4,368,117 | A * | 1/1983 | Hintikka | B03D 1/008 209/4 |
| 4,789,392 | A | 12/1988 | Klimpel et al. | |
| 5,518,634 | A | 5/1996 | Pillai et al. | |
| 6,042,732 | A | 3/2000 | Jankowski et al. | |
| 6,261,341 | B1 | 7/2001 | Cifuentes et al. | |
| 6,409,799 | B1 | 6/2002 | Cifuentes et al. | |
| 6,420,323 | B2 | 7/2002 | Geke et al. | |
| 7,078,374 | B2 | 7/2006 | Howard et al. | |
| 9,169,404 | B2 | 10/2015 | Enghardt et al. | |
| 9,434,846 | B2 | 9/2016 | Martinez-Castro et al. | |
| 9,668,476 | B2 | 6/2017 | Lu et al. | |
| 10,155,917 | B2 | 12/2018 | Coope-Epstein et al. | |
| 10,392,550 | B2 | 8/2019 | Albahrani et al. | |
| 2004/0112834 | A1* | 6/2004 | Perez | C22B 1/00 210/696 |
| 2005/0153864 | A1 | 7/2005 | Corominas | |
| 2006/0110415 | A1 | 5/2006 | Gupta | |
| 2008/0020004 | A1 | 1/2008 | Birkel et al. | |
| 2009/0026145 | A1 | 1/2009 | Hovland et al. | |
| 2009/0301972 | A1* | 12/2009 | Hines | C05C 9/005 210/705 |
| 2011/0177145 | A1 | 7/2011 | Erkenbrecher, Jr. et al. | |
| 2013/0338295 | A1* | 12/2013 | Moore | B03D 1/012 524/456 |
| 2018/0099883 | A1 | 4/2018 | Wilson et al. | |
| 2018/0369834 | A1* | 12/2018 | Rohde | B03C 1/30 |
| 2019/0111442 | A1* | 4/2019 | Jankolovits | B03D 1/02 |
| 2019/0233310 | A1 | 8/2019 | Mohler et al. | |
| 2019/0337825 | A1* | 11/2019 | Painter | C02F 11/143 |

FOREIGN PATENT DOCUMENTS

| | | | | |
|---|---|---|---|---|
| GB | 2406097 A | | 3/2005 | |
| PH | 12011500069 B1 | * | 9/2014 | B03D 1/016 |
| RO | 121695 B1 | | 2/2008 | |
| SU | 1318302 A1 | | 6/1987 | |
| WO | 2006086715 A2 | | 8/2006 | |
| WO | WO-2012080818 A2 | * | 6/2012 | B02C 23/08 |
| WO | 2013121213 A1 | | 8/2013 | |
| WO | WO-2018022352 A1 | * | 2/2018 | B01F 11/0094 |

OTHER PUBLICATIONS

International Search Report in International Application No. PCT/US2021/047310, mailed on Dec. 10, 2021, 6 pages.

Written Opinion in International Application No. PCT/US2021/047310, mailed on Dec. 10, 2021, 13 pages.

Kim et al, "Effects of nonionic surfactant on the rheological property of associative polymers in complex formulations", Polymer, 48(13), pp. 3817-3821 (2007).

Tam et al., "A structural model of hydrophobically modified urethane—ethoxylate (HEUR) associative polymers in shear flows" , Macromolecules, 31(13), pp. 4149-4159 (1998).

Jan Ekstedt, "Influence of coating system composition on moisture dynamic performance of coated wood", Journal of Coatings Technology, 75 (938), pp. 27-37 (2003).

Karunasena et al., "Hydrophobically Modified Ethoxylated Urethane Architecture: Importance for Aqueous- and Dispersed-Phase Properties", Polymers in Aqueous Media, 26, pp. 495-525 (1989).

Dow Surfactants, Reference Chart, Form No. 119-01491-0720 S2D, 16 pages (2020).

Barry A. Wills, Wills' Mineral Processing Technology, An Introduction to the Practical Aspects of Ore Treatment and Mineral Recovery, Seventh Edition, pp. 382-385 (2006).

Patra et al., Improved dewatering of iron ore fines by the use of surfactants, Power Technology 287, 2016, pp. 43-50.

* cited by examiner

METHODS AND COMPOSITIONS FOR PROCESSING SULFIDE ORES

BACKGROUND

Molybdenum disulfide, $MoS_2$ (or moly), also known as molybdenite in crystalline mineral form, is often produced as a coproduct of copper mining. Copper in various combinations with sulfur (including e.g. Chalcocite, $Cu_2S$) is often found in ores that also contain moly. Ores containing both Mo and Cu sulfides are referred to industrially as sulfide ores.

Copper is widely utilized for electronics, construction, and in metal alloys. Molybdenum is used in metal alloys and as a catalyst, and molybdenite itself has a unique and useful combination of properties including superlubricity and plastic bending properties suitable for e.g. flexible electronics applications.

Since markets need both copper and molybdenum, sulfide ores are processed industrially to separate and concentrate both of these valuable metal products for sale and/or for further processing or chemical conversion, such as reduction to the base metal. In a conventional process, separation of sulfide ores begins with comminuting the mined ore using a grinding mill to reduce the size of the mined ore to a gravel, then ball mills or rod mills to crush and grind the gravel to a fine powder containing particles sufficiently small to liberate the metal products from the remainder of the ore materials, or "gangue".

The sulfide ore powder is then processed to separate the sulfide metal products from the gangue. Water is added to the sulfide ore powder to form a sulfide ore slurry. To provide a highly alkaline environment favorable for the separation, an alkaline agent such as lime is also added to the slurry. The pH of a sulfide ore slurry is typically adjusted to be between 7 and 14, often between 8 and 14, more often between 10 and 13. The sulfide ore slurry is aerated in a separation process referred to in the art as froth flotation. In many process sites, both $CuS_2$ and $MoS_2$ are caused to float together in multiple flotation steps, increasing the ratio of metals to gangue collected from the froth phase in each flotation step. In order of increasing ratio of sulfides to gangue collected, rougher flotation cells ("cell" being the industry term of art for chambers or tanks used for batch mode froth flotation) are followed in the process circuit by cleaner column cells, then finally scavenger cells in a serial flotation process to produce a high total yield of sulfide metal product.

The sulfide metal-containing product separates as the froth, or overflow, from this stage of the process. The overflow is collected and subjected to one or more sedimentation processes and optionally one or more filtration processes to reduce water content, forming a concentrate. One or more steps are included in the concentrating and collecting of the sulfide metals in the circuit, which collectively may be referred to industrially as "thickening".

The underflow from the froth flotation includes a gangue which in many cases is a combined gangue including gangue from the rougher and scavenger cells. This underflow gangue may be referred to industrially as tailings. Typically, tailings are also concentrated, or thickened, by sedimentation or filtration or a combination thereof to recover water for reuse within the process. In some cases the tailings are further dewatered by a final filtration to form a tailings concentrate; in other cases, the partly-dewatered tailings are stored in a tailings pond.

After thickening, the sulfide concentrate is sent into a second separation stage to separate the sulfide metal product into a copper product and a molybdenum product. The separation and concentration of copper (sulfide) and moly is known in the industry as the "copper-moly flotation circuit". The copper-moly flotation circuit includes multistage flotation as described above, employing groups of flotation cells and combinations of chemicals, water, and air bubbles to float the molybdenite (moly overflow) and settle out the copper sulfides (copper underflow). Collection of the separated froth overflow and underflow streams is followed by one or more additional flotation steps for each stream to obtain maximum yield of each metal sulfide with minimal use of energy and water. One or more collected overflow streams may further be combined in preparation for thickening, that is, one or more concentration or dewatering processes. Similarly, one or more collected underflow streams may further be combined in preparation for thickening, that is, one or more concentration or dewatering processes.

The collected moly overflow is thickened by one or more concentration steps to form a moly concentrate that generally contains between 80% and 99% $MoS_2$. The collected copper underflow is likewise concentrated to form a copper concentrate. Further treatment of the moly concentrate by acid leaching can be used to dissolve and remove impurities including lead, if desired or otherwise necessary.

We have found that the rate-determining steps in the foregoing series of processes, are often the concentration steps, that is, removal of water by gravity-facilitated settling, or by filtration, or by a combination thereof. Concentration is often time consuming and therefore constitutes a bottleneck in the overall processing of sulfide ores. The rheology of froth phases bearing large metal loadings and often clay materials that swell in the aqueous alkaline environment are thought to be responsible for filtration and settling problems such as rake sticking, sludge buildup, and other process nuisances, which in turn lead to increased down time and decreased overall throughput of the sulfide ore processing plant.

Reducing these challenges would allow for higher copper and/or molybdenum recovery, and/or higher overall plant throughput or efficiency, and could even allow some processing plants to process sulfide ores that they previously could not due to low metal product content, high clay content, or both.

Accordingly, there is a need in the industry to increase the productivity of sulfide ore processing, and there is a particular need to increase the productivity of one or more concentration steps in sulfide ore processing.

SUMMARY OF THE INVENTION

Described herein is a composition comprising a mixture of a nonionic compound, and an overflow or an underflow from a sulfide ore froth flotation. In embodiments, the nonionic compound is a polyalkylene oxide, a structured polyol, or a polyol surfactant. In some such embodiments the nonionic compound is an ethoxylated alkanol. In embodiments the nonionic compound is present in an amount of 1 μg to 1 mg per liter of underflow or overflow. In embodiments the composition includes a viscosity that is 10% to 90% lower than the viscosity of the overflow or underflow in the absence of the nonionic compound. In embodiments the overflow is a copper/moly overflow, a copper overflow, or a molybdenum overflow. In embodiments the underflow is a tailings underflow, a copper underflow, or a molybdenum underflow.

Also described herein is a composition comprising a mixture of a nonionic compound, and a concentrate of an overflow or an underflow from a sulfide ore froth flotation. In embodiments the concentrate is a copper/moly concentrate, a copper concentrate, a molybdenum concentrate, or a tailings concentrate.

Also described herein is a method comprising adding 1 μg to 1 mg of a nonionic compound to each liter of a sulfide ore froth flotation overflow to form a treated overflow. In embodiments the treated overflow is a treated copper/moly overflow, a treated copper overflow, or a treated molybdenum overflow. In embodiments the method further comprises concentrating the treated overflow to form a treated concentrate. In some such embodiments the concentrating is sedimentation, and the method further comprises separating a supernatant from the concentrate after sedimentation.

Also described herein is a method comprising adding 1 μg to 1 mg of a nonionic compound to each liter of a sulfide ore froth flotation underflow to form a treated underflow. In embodiments the treated underflow is a treated tailings underflow, a treated copper underflow, or a treated molybdenum underflow. In embodiments the method further comprises concentrating the treated underflow to form a treated concentrate. In some such embodiments the concentrating is sedimentation, and the method further comprises separating a supernatant from the concentrate after sedimentation.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
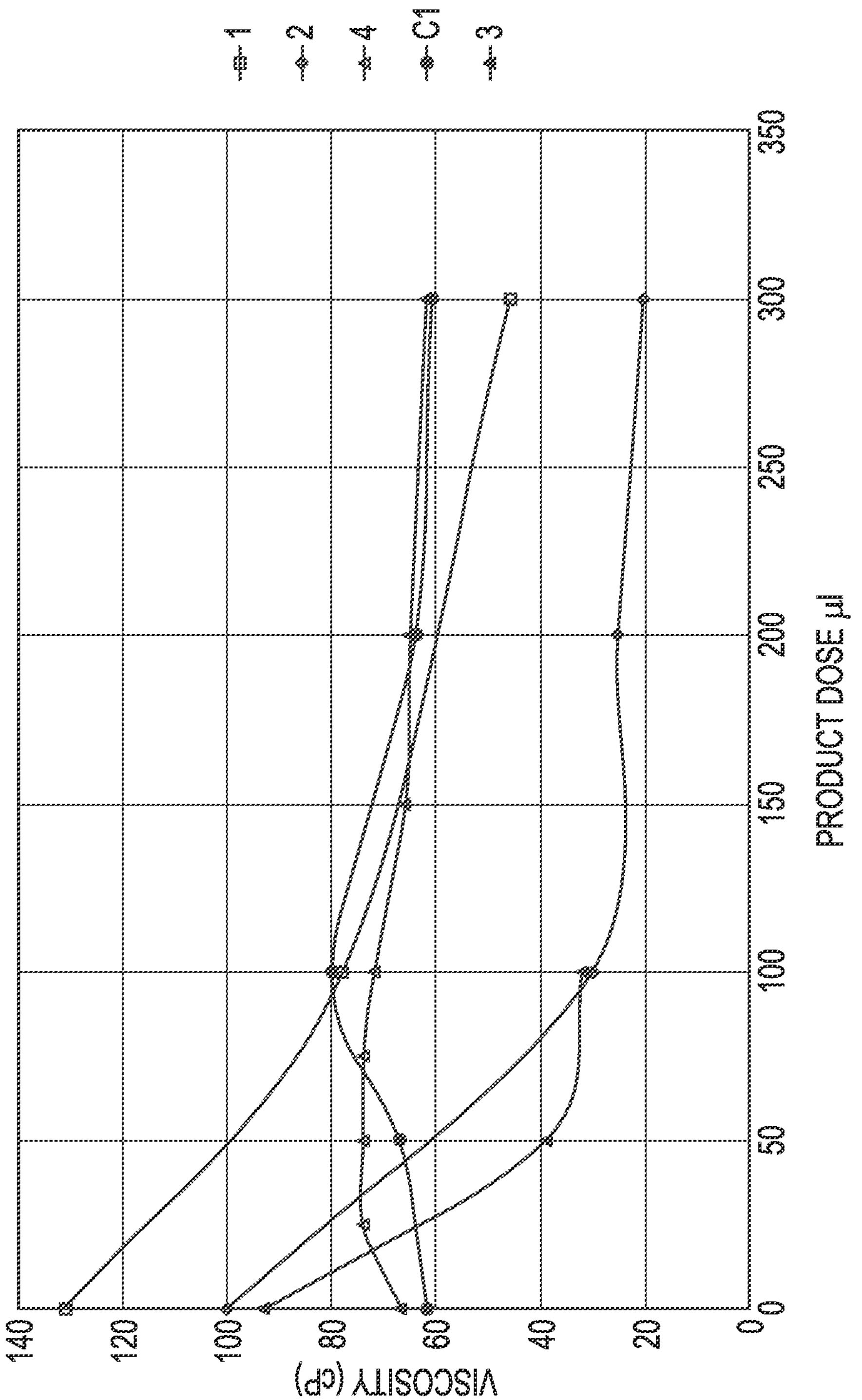
FIG. 1 is a plot of viscosity as a function of dosage for the compositions of Example 1.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

In embodiments, a method comprises, consists essentially of, or consists of separating a sulfide ore by froth flotation to form a sulfide froth or overflow, and a tailings underflow; adding a nonionic compound to the sulfide overflow to form a reduced viscosity sulfide overflow; and removing water from the reduced viscosity sulfide overflow to form a sulfide concentrate. In embodiments, the sulfide concentrate is a reduced viscosity sulfide concentrate. In embodiments, a composition comprises, consists essentially of, or consists of a reduced viscosity sulfide overflow comprising a sulfide overflow from a froth flotation of a sulfide ore, combined with a nonionic compound. In some embodiments, the method further comprises adding a nonionic compound to the tailings underflow from a froth flotation of a sulfide ore to form a reduced viscosity tailings underflow; and removing water from the reduced viscosity tailings underflow to form a tailings concentrate. In embodiments, the tailings concentrate is a reduced viscosity tailings concentrate.

A related method comprises, consists essentially of, or consists of separating a sulfide ore slurry by froth flotation to form a sulfide overflow and a tailings underflow; collecting the tailings underflow; adding a nonionic compound to the tailings underflow to form a reduced viscosity tailings underflow; and removing water from the reduced viscosity tailings underflow to form a tailings concentrate. In embodiments, the tailings concentrate is a reduced viscosity tailings concentrate. In some such embodiments, tailings or waste streams from other processes in a sulfide ore processing plant are combined with the tailings underflow before adding the nonionic compound; in other embodiments the combining is after the adding. Accordingly, in embodiments, a composition comprises, consists essentially of, or consists of a reduced viscosity tailings underflow comprising a tailings underflow from a froth flotation of a sulfide ore and a nonionic compound.

In still other embodiments, a method comprises, consists essentially of, or consists of separating a sulfide concentrate by froth flotation to form a molybdenum overflow and a copper underflow; collecting the molybdenum overflow; adding a nonionic compound to the molybdenum overflow to form a reduced viscosity molybdenum overflow; and removing water from the reduced viscosity molybdenum overflow to form a molybdenum concentrate. In some embodiments, the molybdenum concentrate is a reduced viscosity molybdenum concentrate. Accordingly, in embodiments, a composition comprises, consists essentially of, or consists of a reduced viscosity molybdenum overflow comprising a molybdenum overflow from a froth flotation of a sulfide concentrate, and a nonionic compound.

In some such embodiments, the foregoing method further comprises collecting a copper underflow, adding a nonionic compound to the copper underflow to form a reduced viscosity copper underflow; and removing water from the reduced viscosity copper underflow to form a copper concentrate. In some embodiments, the copper concentrate is a reduced viscosity copper concentrate. Accordingly, in embodiments, a composition comprises, consists essentially of, or consists of a reduced viscosity copper underflow, comprising a copper underflow from a froth flotation of a sulfide concentrate, and a nonionic compound.

In related embodiments, a method comprises, consists essentially of, or consists of separating a sulfide concentrate by froth flotation to form a molybdenum overflow and a copper underflow; collecting the copper underflow; adding a nonionic compound to the copper underflow to form a reduced viscosity copper underflow; and removing water from the reduced viscosity copper underflow to form a copper concentrate. In some embodiments, the copper concentrate is a reduced viscosity copper concentrate.

In related embodiments, a method comprises separating a sulfide concentrate by froth flotation to form a copper overflow and a molybdenum underflow; collecting the copper overflow; adding a nonionic compound to the copper overflow to form a reduced viscosity copper overflow; and removing water from the reduced viscosity copper overflow to form a copper concentrate. In some embodiments, the copper concentrate is a reduced viscosity copper concentrate. Accordingly, in embodiments, a composition comprises, consists essentially of, or consists of a reduced viscosity copper overflow, comprising a copper overflow from a froth flotation of a sulfide concentrate and a nonionic compound. Further, in embodiments, a composition comprises, consists essentially of, or consists of a reduced viscosity copper concentrate, comprising a copper concentrate and a nonionic compound.

In some such embodiments, the method further comprises collecting the molybdenum underflow, adding a nonionic compound to the molybdenum underflow to form a reduced viscosity molybdenum underflow; and removing water from the reduced viscosity molybdenum underflow to form a molybdenum concentrate. In some embodiments, the molybdenum concentrate is a reduced viscosity molybdenum concentrate. Accordingly, in embodiments, a composition comprises, consists essentially of, or consists of a reduced viscosity molybdenum underflow, comprising a molybdenum underflow from a froth flotation of a sulfide concentrate and a nonionic compound. Further, in embodiments, a composition comprises, consists essentially of, or consists of a reduced viscosity molybdenum concentrate, comprising a molybdenum concentrate and a nonionic compound.

In any one or more of the foregoing embodiments herein, a froth or an overflow is a combined overflow stream. A combined overflow stream includes two or more sulfide overflows, or two or more molybdenum overflows, or two or more copper overflows. The combined overflows are formed by combining the overflows of two or more separation and collection tanks or pods in an ore processing plant, wherein froth flotation processes targeting the same overflow composition are suitably collected in separate, batchwise processes, and the collected overflows are combined to form a combined overflow stream.

In any one or more of the foregoing embodiments herein, an underflow is a combined underflow stream. Thus, in embodiments, multiple froth flotation processes are employed, wherein underflows from two or more of the processes targeting the same underflow composition are suitably collected and combined to form a combined underflow stream. A combined underflow stream includes two or more tailings underflows, two or more molybdenum underflows, or two or more copper underflows. In the same or in a different set of froth flotation separation processes, combined streams are formed by combining the underflows of two or more separation and collection tanks or pods in an ore processing plant, wherein froth flotation processes targeting the same underflow composition are suitably collected in separate, batchwise processes, and the collected underflows thereof combined to form a combined underflow stream.

Such combining of overflows and underflows is routinely carried out in an ore processing plant designed to obtain maximum yield of metal sulfide products with minimal use of energy and water. In embodiments, a nonionic compound is added to a collected overflow prior to forming a combined overflow stream. In embodiments, a nonionic compound is added to a collected overflow after forming a combined overflow stream. In embodiments, a nonionic compound is added to a collected underflow prior to forming a combined underflow stream. In embodiments, a nonionic compound is added to a collected underflow after forming a combined underflow stream. One or more collected overflows may further be combined to form a combined overflow stream in preparation for thickening, that is, one or more concentration or dewatering processes. Similarly, one or more collected underflows may further be combined to form a combined underflow stream in preparation for thickening, that is, one or more concentration or dewatering processes.

Combining streams in some embodiments is a source of a continuous or semi-continuous concentration or thickening, as overflows or underflows are combined and subjected to a single concentration step or series of steps.

In any of the foregoing embodiments, a nonionic compound is suitably added to an overflow during or after collecting the overflow, that is, before concentrating. In any of the foregoing embodiments, a nonionic compound is suitably added to an overflow after collecting and before concentrating. In some such embodiments, a nonionic compound is suitably added to an overflow stream after collecting but before combining said overflow stream with another stream. In other such embodiments, a nonionic compound is suitably added to a combined overflow stream after the collecting and after the combining but before the concentrating. Combinations of the foregoing, including multiple additions of one or more nonionic compounds in one or more locations in a sulfide ore processing plant are envisioned.

Additionally, in any of the foregoing embodiments, a nonionic compound is suitably added to an overflow or a combined overflow stream during the concentrating. Further in any of the foregoing embodiments, a nonionic compound is suitably added in more than one addition to an overflow, wherein the one or more additions are during collecting, after collecting but before combining, during combining, after combining but before concentrating, during concentrating, or two or more thereof.

In any of the foregoing embodiments, a nonionic compound is suitably added to an underflow during or after collecting the underflow, that is, before concentrating. In any of the foregoing embodiments, a nonionic compound is suitably added to an underflow after collecting and before concentrating. In some such embodiments, a nonionic compound is suitably added to a combined underflow stream after collecting but before combining. In other such embodiments, a nonionic compound is suitably added to a combined underflow stream after the collecting and after the combining but before the concentrating.

Additionally, in any of the foregoing embodiments, a nonionic compound is suitably added to an underflow or a combined underflow stream during the concentrating. Further in any of the foregoing embodiments, a nonionic compound is suitably added in more than one addition to an underflow, wherein the one or more additions are during collecting, after collecting but before combining, during combining, after combining but before concentrating, during concentrating, or two or more thereof.

In accordance with the foregoing, a nonionic compound is added to a sulfide overflow, a sulfide concentrate, a tailings underflow, a molybdenum overflow, a molybdenum underflow, a copper overflow, or a copper underflow to form a reduced viscosity sulfide overflow, a reduced viscosity sulfide concentrate, a reduced viscosity tailings underflow, a reduced viscosity molybdenum overflow, a reduced viscosity molybdenum underflow, a reduced viscosity copper overflow, or a reduced viscosity copper underflow. Further in accordance with the foregoing, a reduced viscosity underflow includes a nonionic compound and an underflow including a tailings underflow, a molybdenum underflow, or a copper underflow. Further in accordance with the foregoing, a reduced viscosity overflow includes a nonionic compound and an overflow or froth overflow including a sulfide overflow, a molybdenum overflow, or a copper overflow. Further in accordance with the foregoing, a reduced viscosity concentrate includes a nonionic compound and a concentrate including a sulfide concentrate, a tailings concentrate, a molybdenum concentrate, or a copper concentrate.

Nonionic Compounds

In embodiments, nonionic compounds usefully employed in the methods and compositions described are polyols, polyol surfactants, and mixtures thereof.

In embodiments, nonionic compounds usefully employed in the methods and compositions described above include polyalkylene oxide oligomers and polymers; polyalkylene oxide oligomers and polymers functionalized with alkyl, aryl, or alkaryl groups; structured polyols; structured polyols functionalized with alkyl, aryl, or alkaryl groups, polyalkylene oxide functionality, or two or more thereof. In embodiments, the nonionic compound is a mixture of two or more of the foregoing compounds, in any ratio, as selected by the user or operator.

In embodiments, nonionic compounds usefully employed in the methods and compositions described are polyols. Polyols include polyalkylene oxides including alkylene oxide oligomers and polymers, structured polyols, and structured polyols functionalized with polyalkylene oxides. In embodiments, polyalkylene oxides usefully employed in the methods and compositions described above include polyethylene oxide, polypropylene oxide, and random or block copolymers thereof that are linear, branched, hyperbranched, or dendritic. The alkylene oxide oligomers and polymers are characterized as having a weight-average molecular weight of 200 g/mol to 100,000 g/mol, for example 200 g/mol to 50,000 g/mol, or 200 g/mol to 10,000 g/mol, or 200 g/mol to 5,000 g/mol, or 200 g/mol to 1,000 g/mol, or 500 g/mol to 100,000 g/mol, or 500 g/mol to 50,000 g/mol, or 500 g/mol to 10,000 g/mol, or 500 g/mol to 9,000 g/mol, or 500 g/mol to 8,000 g/mol, or 500 g/mol to 7,000 g/mol, or 500 g/mol to 6,000 g/mol, or 500 g/mol to 5,000 g/mol, or 500 g/mol to 4,000 g/mol, or 500 g/mol to 3,000 g/mol, or 500 g/mol to 2,000 g/mol, or 300 g/mol to 50,000 g/mol, or 300 g/mol to 10,000 g/mol, or 300 g/mol to 9,000 g/mol, or 300 g/mol to 8,000 g/mol, or 300 g/mol to 7,000 g/mol, or 300 g/mol to 6,000 g/mol, or 300 g/mol to 5,000 g/mol, or 300 g/mol to 4,000 g/mol, or 300 g/mol to 3,000 g/mol, or 300 g/mol to 2,000 g/mol, or 1000 g/mol to 100,000 g/mol, or 2000 g/mol to 100,000 g/mol, or 3000 g/mol to 100,000 g/mol, or 4000 g/mol to 100,000 g/mol, or 5000 g/mol to 100,000 g/mol, or 10,000 g/mol to 100,000 g/mol, or 1000 g/mol to 50,000 g/mol, or 1000 g/mol to 10,000 g/mol, or 1000 g/mol to 5,000 g/mol.

In embodiments, structured polyols usefully employed in the methods and compositions described above include polymerized reaction products of triols such as glycerol. Structured glycerol-based polyols are as described in U.S. Patent Application Publication No. 2011/092743, which is incorporated by reference herein in its entirety. In some embodiments, the glycerol-based polyols have the following structure:

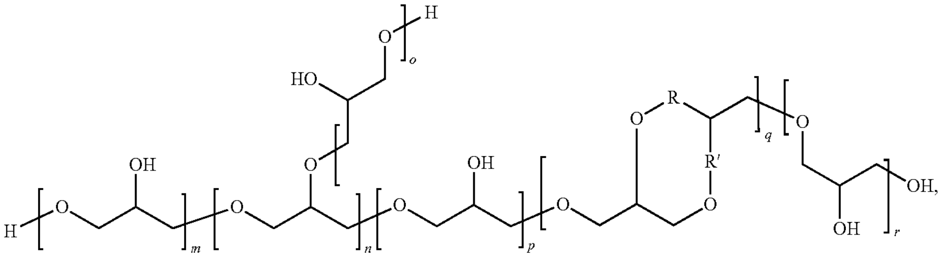

where each m, n, o, p, q, and r is independently any integer; and R and R' are $(CH_2)_{n'}$, where n' is independently 0 or 1. In some embodiments, the sum of m, n, o, p, q, and r is from 2 to 135, or from 5 to 135, or from 10 to 135, or from 20 to 135, or from 30 to 135, or from 40 to 135, or from 50 to 135, or from 60 to 135, or from 70 to 135, or from 80 to 135, or from 90 to 135, or from 100 to 135, or from 110 to 135, or from 120 to 135, or from 2 to 130, or from 2 to 120, or from 2 to 110, or from 2 to 100, or from 2 to 90, or from 2 to 80, or from 2 to 70, or from 2 to 60, or from 2 to 50, or from 2 to 40, or from 2 to 30, or from 2 to 20, or from 2 to 10.

The glycerol-based polyols may be polyglycerols, polyglycerol derivatives, polyols having glycerol-based monomer units and non-glycerol monomer units, or combinations thereof. The glycerol and glycerol-based monomer units may be selected from the following structures I-VIII:

I

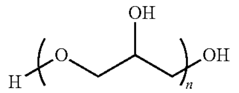

II

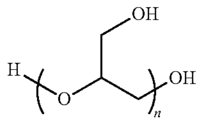

III

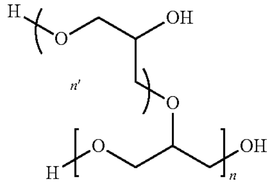

IV

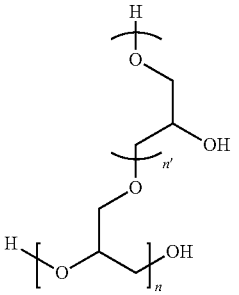

V

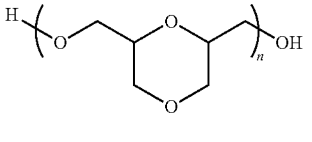

-continued

VI

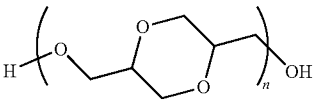

VII

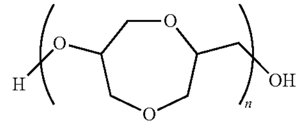

VIII

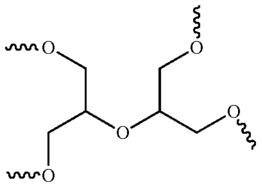

, where each n and n' is independently any integer.

Glycerol monomer units may self-condense to form the 6- or 7-membered structures V-VII. The non-glycerol monomer units may include polyols such as pentaerythritol and glycols, amines, other monomers capable of reacting with glycerol or glycerol-based polyol intermediates and any combination thereof. In embodiments, the glycerol-based polyols include at least two hydroxyl groups.

In embodiments, a structured polyol has a degree of branching of about 0.1 to about 0.5, or about 0.2 to about 0.5, or about 0.1 to about 0.4. As used herein, "degree of branching" means the mole fraction of monomer units at the base of a chain branching away from the main polymer chain relative to a perfectly branched dendrimer. In a perfect dendrimer the degree of branching is 1. The degree of branching of a structured polyol is suitably determined by $^{13}C$ NMR as described in *Macromolecules* (1999) 32:4240-4246. Cyclic units are not included in the degree of branching.

In some embodiments, a glycerol-based structured polyol has a degree of cyclization of about 0.01 to about 0.19, or about 0.02 to about 0.19, or about 0.05 to about 0.19, or about 0.10 to about 0.19, or about 0.02 to about 0.18, or about 0.02 to about 0.15, or about 0.02 to about 0.10, or about 0.15 to about 0.18. As used herein, "degree of cyclization" means the mol fraction of cyclic structure units, such as structures V-VII above, relative to the total monomer units in a polymer. The degree of cyclization may be suitably determined by $^{13}C$ NMR.

In some embodiments, a glycerol-based polyol has an average molecular weight of at least 166 g/mol. In some embodiments, a glycerol-based polyol has an average molecular weight of 166 g/mol to 10,000 g/mol, or 240 g/mol to 10,000 g/mol, or 314 g/mol to 10,000 g/mol, or 388 g/mol to 10,000 g/mol, or 462 g/mol to 10,000 g/mol, or 1,000 g/mol to 10,000 g/mol, or 2,000 g/mol to 10,000 g/mol, or 3,000 g/mol to 10,000 g/mol, or 4,000 g/mol to 10,000 g/mol, or 5,000 g/mol to 10,000 g/mol, or 166 g/mol to 9,000 g/mol, or 166 g/mol to 8,000 g/mol, or 166 g/mol to 7,000 g/mol, or 166 g/mol to 6,000 g/mol, or 166 g/mol to 5,000 g/mol, or 166 g/mol to 4,000 g/mol, or 166 g/mol to 3,000 g/mol, or 166 g/mol to 2,000 g/mol, or 166 g/mol to 1,000 g/mol.

In embodiments, structured polyols include hyperbranched polymers such as highly-branched glycidol-based polyols as disclosed in U.S. Pat. No. 6,822,068 and poly (glycidol) multi-branched polymers as disclosed in Sunder et al, *Macromolecules* (1999) 32:4240-4246, each reference being incorporated by reference herein in its entirety. Examples of structured polyols also include dendrimers as disclosed in Garcia-Bernabé et al. *Chem. Eur. J.* (2004) 10:2822-2830; Siegers et al, *Chem. Eur. J.* (2004) 10:2831-2838; and Haag et al, *J. Am. Chem. Soc.* (2000) 122:2954-2955, each of which is incorporated by reference herein in its entirety.

In embodiments, a structured polyol is further functionalized with one or more polyalkylene oxide groups. The polyalkylene oxide groups include any of the polyalkylene oxide oligomers or polymers described above. Thus, in embodiments, one or more hydroxyl moieties of the structured polyol is covalently bonded to a polyalkylene oxide.

In embodiments, the nonionic compound is a polyol surfactant. Polyol surfactants are surface active agents including any of the polyols described herein, further functionalized with one or more hydrophobic moieties. Thus, the polyol surfactants are polyalkylene oxide, structured polyols, or structured polyols functionalized with polyalkylene oxide, and further including a hydrophobic moiety bonded thereto. The hydrophobic moiety is an alkyl, aryl, or alkaryl moiety including at least 6 carbons. In some embodiments, the one or more alkyl, aryl, or alkaryl moieties further include one or more heteroatoms such as N, O, Cl, F, or S. In embodiments, the hydrophobic moiety is covalently bonded to the polyol through an ether bond, a carbon-carbon bond, or through an ester bond. In embodiments, a hydrophobic moiety includes 6 to 50 carbon atoms, or 8 to 50 carbons, or 10 to 50 carbons, or 12 to 50 carbons, or 14 to 50 carbons, or 16 to 50 carbons, or 18 to 50 carbons, or 20 to 50 carbons, or 30 to 50 carbons, or 40 to 50 carbons, or 6 to 40 carbons, or 6 to 30 carbons, or 6 to 20 carbons, or 6 to 18 carbons, or 6 to 16 carbons, or 6 to 14 carbons, or 6 to 12 carbons, or 6 to 10 carbons, or 6 to 8 carbons, or 10 to 40 carbons, or 12 to 40 carbons, or 10 to 30 carbons, or 12 to 30 carbons. In embodiments the number of carbons recited for an alkyl, aryl, or alkaryl moiety represents a range or average value of number of carbons, as determined by context.

In embodiments, the polyol surfactant is characterized as having an HLB of between 1 and 20. The HLB of the polyol surfactant in embodiments is about 1-5, 5-10, 10-15, 15-20, 1-10, 10-20, 5-15, 12-6, 3-7, 4-8, 5-9, 6-10, 7-11, 8-12, 9-13, 10-14, 11-15, 12-16, 13-17, 14-18, 15-19, 16-20, 1-2, 2-3, 3-4, 4-5, 5-6, 6-7, 7-8, 8-9, 9-10, 10-11, 11-12, 12-13, 13-14, 14-15, 15-16, 16-17, 17-18, 18-19, 19-20, 2-18, 2-15, 5-18, 7-15, 8-15, or 5-12.

In embodiments, one or more hydrophobic moieties are derived from a tall oil. In embodiments, one or more hydrophobic moieties are derived from an alkanol. In embodiments, the alkanol is a C6-C50 linear, branched, or cyclic alkanol or a linear, branched, or cyclic alkanol having an average of 6 to 50 carbons, such as an average of 8-40, 10-40, 12-40, 8-30, 10-30, 12-30, 8-20, 10-30, 10-20, 10-18, 10-16, 10-14, 12-20, 12-18, 12-16, 6, 7, 8, 9, 10, 11, 12, 13, 14, 15, 16, 17, 18, 19, 20, 22, 24, 26, 28, 30, 32, 34, 36, 38, 40, 42, 44, 46, 48, or 50 carbons.

In embodiments, the nonionic compound is added to an overflow or an underflow "neat" (100% "active" compound). In other embodiments, the nonionic compound is mixed with one or more additional materials and added to an underflow or an overflow as a mixture thereof. One or more additional materials include solvents and pH adjustment agents.

Suitable solvents include petroleum distillate solvents and natural oils such as tall oils and plant-based fatty acids. Suitable solvents also include water and aqueous mixtures of water with salts, pH adjustment agents or buffers such as sodium acetate or potassium acetate. Additional suitable solvents include water or aqueous mixtures further mixed with cosolvents. Cosolvents include water-miscible or partially water-miscible compounds such as methanol, ethanol, isopropanol, n-propanol, n-butanol, isobutanol, ethylene glycol, propylene glycol, 2-methoxyethanol (methyl cellosolve), diethylene glycol, 2-(2-methoxyethoxy) ethanol, bis (2-methoxyethyl) ether (diglyme), triethylene glycol, glycerol, ethyl acetate, acetone, methyl ethyl ketone, triacetin, and the like.

Cosolvents, where included, are present in a mixture with one or more nonionic compounds and water, along with any other materials such as those described above. The cosolvents and water are present in some embodiments at a volume ratio of 1:1000 to 1:1 cosolvent:water, or a mass ratio of 1:1000 to 1:1 cosolvent:water, as selected by the user or operator, for example a volume ratio of 1:1000 to 1:5, or 1:1000 to 1:10, or 1:1000 to 1:20, or 1:1000 to 1:30, or 1:1000 to 1:40, or 1:1000 to 1:50, or 1:1000 to 1:100, or 1:100 to 1:1, or 1:100 to 1:5, or 1:100 to 1:10, or 1:100 to 1:20, or 1:100 to 1:30, or 1:100 to 1:40, or 1:100 to 1:50, or 1:50 to 1:1, or 1:50 to 1:5, or 1:50 to 1:10, or 1:50 to 1:20, or 1:50 to 1:30, or 1:50 to 1:40, or 1:20 to 1:1, or 1:20 to 1:5, or 1:20 to 1:10; or a mass ratio of 1:1000 to 1:5, or 1:1000 to 1:10, or 1:1000 to 1:20, or 1:1000 to 1:30, or 1:1000 to 1:40, or 1:1000 to 1:50, or 1:1000 to 1:100, or 1:100 to 1:1, or 1:100 to 1:5, or 1:100 to 1:10, or 1:100 to 1:20, or 1:100 to 1:30, or 1:100 to 1:40, or 1:100 to 1:50, or 1:50 to 1:1, or 1:50 to 1:5, or 1:50 to 1:10, or 1:50 to 1:20, or 1:50 to 1:30, or 1:50 to 1:40, or 1:20 to 1:1, or 1:20 to 1:5, or 1:20 to 1:10.

In embodiments, a nonionic compound is added to an overflow, an underflow, a combined overflow stream, or a combined underflow stream in an amount of about 1 ppm to 1000 ppm on a weight/volume basis of the overflow or an underflow. In embodiments, 1 μg to 1 mg of the nonionic compound is added per liter of underflow or overflow. In embodiments, the nonionic compound is added neat or mixed with one or more additional materials as described above, and added to an overflow or an underflow in one or more additions to provide a total of 1 μg to 1 mg of the nonionic compound per liter of the underflow or overflow. In embodiments, 5 μg to 1 mg, 10 μg to 1 mg, 15 μg to 1 mg, 20 μg to 1 mg, 25 μg to 1 mg, 30 μg to 1 mg, 35 μg to 1 mg, 40 μg to 1 mg, 45 μg to 1 mg, 50 μg to 1 mg, 55 μg to 1 mg, 60 μg to 1 mg, 65 μg to 1 mg, 70 μg to 1 mg, 75 μg to 1 mg, 80 μg to 1 mg, 85 μg to 1 mg, 90 μg to 1 mg, 95 μg to 1 mg, 100 μg to 1 mg, 150 μg to 1 mg, 200 μg to 1 mg, 250 μg to 1 mg, 300 μg to 1 mg, 350 μg to 1 mg, 400 μg to 1 mg, 450 μg to 1 mg, 500 μg to 1 mg, 600 μg to 1 mg, 700 μg to 1 mg, 800 μg to 1 mg, 900 μg to 1 mg, 1 μg to 900 μg, 1 μg to 800 μg, 1 μg to 700 μg, 1 μg to 600 μg, 1 μg to 500 μg, 1 μg to 450 μg, 1 μg to 400 μg, 1 μg to 350 μg, 1 μg to 300 μg, 1 μg to 250 μg, 1 g to 200 μg, 1 μg to 150 μg, 1 μg to 100 μg, 10 μg to 100 μg, 10 μg to 90 μg, 10 μg to 80 μg, 10 μg to 70 μg, 10 μg to 60 μg, or 10 μg to 50 μg of the nonionic compound per liter of the underflow or overflow.

Concentration Processes

According to the methods disclosed herein, one or more nonionic compounds are added to one or more overflows or underflows obtained from froth flotation of a sulfide ore.

According to the uses disclosed herein, one or more nonionic compounds are used to obtain a reduced viscosity overflow, a reduced viscosity underflow, or a reduced viscosity concentrate. Accordingly, one or more nonionic compounds are added to one or more overflows or underflows obtained from froth flotation of a sulfide ore prior to concentrating the overflow or underflow to obtain a concentrate, or during one or more concentrating steps to obtain a concentrate, or a combination of additions at multiple concentrating steps between collecting an overflow or underflow, and completing concentration thereof to form a concentrate.

Collectively, the steps between collecting an overflow or underflow, and completing the concentration thereof to form a concentrate is referred to industrially as "thickening". Thickening, concentrating, and dewatering are used in reference herein to the process of removing water from a slurry that is an overflow or an underflow of a froth flotation process. Concentrating results in formation of a concentrate, which is a slurry having a higher percentage of solids than the overflow or underflow. One or more collected overflow streams may further be combined in preparation for concentrating or even during the concentrating, such as in a continuous concentration process. Similarly, one or more collected underflow streams may further be combined in preparation for concentrating or during the concentrating.

Industrially, sedimentation is used to increase the concentration of solid product in an overflow or underflow. In embodiments, sedimentation is achieved using a large tank apparatus referred to as a "thickener". Thickeners may be batch or continuous units. In most cases, the concentration of particulate slurried in a thickener is sufficiently high for hindered settling to occur. Within the tank of the thickener are one or more rotating radial arms, from each of which are suspended a series of blades, shaped so as to rake the settled solids towards a central outlet at the bottom of the tank. The blades also assist the compaction of settled particles and produce a concentrate having less water content than can be achieved by simple gravitational settling. The solids in the thickener are thus moved continuously downwards, and then inwards towards the thickened underflow outlet at the bottom of the tank, while the liquid moves upwards and radially outwards.

In embodiments, a concentrate is collected from the central outlet by pumping, or by pressure imposed by a hydrostatic head or other source of pressurized urging. The concentrate collected from the central outlet is transported via piping to one or more apparatuses for further treatment and processing.

Sedimentation, whether in a thickener apparatus or some other apparatus suitable for sedimentation, thereby results in formation of a clarified supernatant and a concentrate. The supernatant is separated from the concentrate and subjected to one or more further flotation, filtration, and/or recycling processes within the processing plant. Other gravity-based methods such as centrifugation may be used, increasing gravitational force to greater than 1 atmosphere to obtain more rapid compaction and separation of particulates from liquid to result in a concentrate.

The concentrates are compositionally differentiated from the source overflow or underflow by the concentration of solids in the source and concentrate slurries. A concentrate, that is a concentrated slurry, includes at least 30% solids by weight and is up to 80% solids by weight, for example 40% to 80%, or 40% to 70%, or 50% to 80%, or 50% to 70%, or 55% to 65% solids by weight. On the other hand, a source slurry, that is, a slurry prior to concentration, includes 20% solids by weight or less, for example 1% to 20%, or 5% to 15% or even 5% to 10% solids by weight.

In embodiments, one or more nonionic compounds are mixed with an overflow or an underflow present in any one or more location within the foregoing described collecting, combining, and concentrating processes, or during pumping or transportation between locations within a production plant to carry out stages of the process, to obtain a treated overflow or treated underflow. The mixing is obtained using direct addition or by further including static or active mixing of the nonionic compound with an overflow or an underflow. The mixing is suitably carried out by adding one or more nonionic compounds in a single addition to an overflow or to an underflow; or by adding one or more nonionic compounds to an overflow or an underflow in multiple locations in a processing facility, as determined by the operator with knowledge of process capabilities such as points of possible addition to an overflow or underflow stream.

As mentioned above, treated overflows in a sulfide ore process include treated copper/moly (sulfide) overflows, treated copper overflows, and treated molybdenum overflows; and treated underflows include treated tailings underflows, treated copper underflows, and treated molybdenum underflows. A treated underflow or treated overflow may optionally be a treated combined underflow or a treated combined overflow. The treated underflows and treated overflows are then concentrated to form treated concentrates, that is, treated sulfide concentrates, treated tailings concentrates, treated copper concentrates, and treated molybdenum concentrates.

Unexpectedly, when one or more nonionic compounds are mixed with one or more products of sulfide ore froth flotation, the viscosity of the treated products is reduced, thereby achieving several benefits including faster concentration and improved flowability of the resulting concentrates. The nonionic compounds added to an overflow or an underflow from froth flotation of a sulfide ore, provides a reduced viscosity overflow or a reduced viscosity underflow over a range of pH, including pH as high as 14. The treated overflows and treated underflows obtain lower viscosity within the concentration process as compared to the untreated overflow or untreated underflow. And the treated concentrates thereby also obtain a benefit of lower viscosity when compared to untreated concentrates.

In embodiments, the nonionic compounds obtain the reduced viscosity when compared to anionic and cationic compounds. In embodiments, the nonionic compounds obtain the reduced viscosity when compared to anionic surfactants, cationic surfactants, and ionic polymers including ionic polymeric surfactants. Thus, in some embodiments, a treated overflow, treated underflow, or treated concentrate excludes anionic surfactants. In some embodiments, a treated overflow, treated underflow, or treated concentrate excludes cationic surfactants. In some embodiments, a treated overflow, treated underflow, or treated concentrate excludes ionic polymers. In some embodiments, a treated overflow, treated underflow, or treated concentrate excludes ionic polymeric surfactants. In some embodiments, a treated overflow, treated underflow, or treated concentrate excludes two or more of: anionic surfactants, cationic surfactants, and ionic polymers.

In embodiments, an overflow or an underflow obtains a viscosity reduction of 10% to 90% when a nonionic compound or mixture thereof is added at 100 μg of the nonionic compound per liter of underflow/overflow, viscosity is measured at 20° C.-25° C. using a Brookfield viscometer and V72 spindle at 30 RPM. Thus an overflow or an underflow obtains a reduction of 10% to 90%, or 15% to 90%, or 20% to 90%, or 25% to 90%, or 30% to 90%, or 35% to 90%, or 40% to 90%, or 45% to 90%, or 50% to 90%, or 65% to 90%, or 70% to 90%, or 75% to 90%, or 80% to 90%, or 85% to 90%, or 10% to 15%, or 15% to 20% or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 75% to 80%, or 80% to 85%, or 10% to 85%, or 10% to 80%, or 10% to 75%, or 10% to 70%, or 10% to 65%, or 10% to 60%, or 10% to 55%, or 10% to 50%, or 10% to 45%, or 10% to 40%, or 10% to 35%, or 10% to 30%, or 10% to 25%, or 10% to 20% when a nonionic compound is added at 100 μg of the nonionic compound per liter of underflow/overflow, when measured 20° C.-25° C. using a Brookfield viscometer and V72 spindle at 30 RPM. In embodiments, an overflow or an underflow obtains a reduction of 20% to 90% when a nonionic compound or mixture thereof is added at 100 μg of the nonionic compound per liter of underflow/overflow, when measured 20° C.-25° C. using a Brookfield viscometer and V72 spindle at 30 RPM.

Further, in some embodiments, even less than 100 μg of a nonionic compound or mixture thereof per liter of underflow/overflow obtains a viscosity reduction of 10% to 90%, or 15% to 90%, or 20% to 90%, or 25% to 90%, or 30% to 90%, or 35% to 90%, or 40% to 90%, or 45% to 90%, or 50% to 90%, or 65% to 90%, or 70% to 90%, or 75% to 90%, or 80% to 90%, or 85% to 90%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 75% to 80%, or 80% to 85%, or 20% to 85%, or 20% to 80%, or 20% to 75%, or 20% to 70%, or 20% to 65%, or 20% to 60%, or 20% to 55%, or 20% to 50%. Thus, in some embodiments, a nonionic compound or mixture thereof is added at 20 μg to 90 μg of the nonionic compound per liter of underflow/overflow to achieve the foregoing viscosity reduction. In embodiments, an overflow or an underflow obtains a reduction of 20% to 90% when a nonionic compound is added at 20 μg, 25 μg, 30 μg, 35 μg, 40 μg, 45 μg, 50 μg, 55 μg, 60 μg, 65 μg, 70 μg, 75 μg, 80 μg, 85 μg, 90 μg, or 95 μg of the nonionic compound per liter of underflow/overflow, when measured at 20° C.-25° C. using a Brookfield viscometer and V72 spindle at 30 RPM.

Compared to untreated concentrates, the treated concentrates provide a number of unexpected benefits. The following observed benefits apply to any one of the treated concentrates described herein. In embodiments the treated concentrates obtain a benefit of reduced shear viscosity. In embodiments the treated concentrates obtain a benefit of reduced extensional viscosity. In embodiments the treated concentrates obtain a benefit of reduced yield stress. In embodiments the treated concentrates obtain a benefit of improved flow as the treated concentrate is transported within the processing plant. In embodiments, improved flow is evidenced by Imhoff cone sedimentation tests showing significantly reduced solid residue remaining after a treated concentrate has traversed the cone. In embodiments the treated concentrates obtain a benefit of reduced raking since less solid residue is deposited on walls and other surfaces during processing and transportation of the treated concentrate. In embodiments the treated concentrates obtain a benefit of reduced strain on raking equipment by preventing buildup of particulates on vessel walls. In embodiments the treated concentrates obtain a benefit of reduced downtime in the plant for cleaning surfaces to remove built up particulate residue thereon. In particular, residues built up on the rakes can cause them to become unbalanced, requiring adjustment in addition to cleaning in order to maintain acceptable performance.

Compared to untreated underflows and untreated overflows, the treated underflows and treated overflows provide a number of unexpected benefits. The following observed benefits apply to any one of the treated flows described herein. The treated flows obtain the benefit of faster transportation, such as from a vessel, into a vessel, or through a pipe. The treated flows obtain the benefit of lower solid residue on all surfaces contacted by the treated flows. The treated flows obtain the benefit of requiring less force to achieve pumping, stirring, mixing, and other physical manipulations. This is turn leads to the benefits of reduced energy use in the processing plant, and less wear and tear on plant equipment. The treated flows obtain the benefit of reduced solid adhesion to the surfaces of thickeners and other apparatuses used for sedimentation (concentration), which leads in turn to the benefits of less raking, less cleaning, and less downtime in the thickener portion of the process.

In another unexpected result, we have observed that the treated underflows and treated overflows undergo sedimentation more quickly than untreated underflows and overflows. Measurements using Imhoff sedimentation cones indicate that sedimentation time, as gauged by the time to empty the Imhoff cone, is reduced by at least 10% and as much as 90% when a nonionic compound or mixture thereof is added at 100 μg of the nonionic compound per liter of underflow/overflow. That is, sedimentation time is reduced by 10% to 90%, or 15% to 90%, or 20% to 90%, or 25% to 90%, or 30% to 90%, or 35% to 90%, or 40% to 90%, or 45% to 90%, or 50% to 90%, or 65% to 90%, or 70% to 90%, or 75% to 90%, or 80% to 90%, or 85% to 90%, or 20% to 25%, or 25% to 30%, or 30% to 35%, or 35% to 40%, or 40% to 45%, or 45% to 50%, or 50% to 55%, or 55% to 60%, or 60% to 65%, or 65% to 70%, or 75% to 80%, or 80% to 85%, or 20% to 85%, or 20% to 80%, or 20% to 75%, or 20% to 70%, or 20% to 65%, or 20% to 60%, or 20% to 55%, or 20% to 50% when a nonionic compound or mixture thereof is added at 100 μg of the nonionic compound per liter of underflow/overflow.

The following Experimental section provides exemplary findings in accord with the foregoing, without being limiting in any way.

EXPERIMENTAL SECTION

Several exemplary compositions including nonionic compounds were formed by admixing the components listed in Table 1. A control mixture "C1" including an anionic compound was also prepared, by admixing 59 wt % water, 5.5% ammonium sodium sulfate, and 35.5 wt % of a copolymer of ammonium acrylate and ammonium 2-acrylamido-2-propanesulfonate. Mixture C1 and compositions 1-5 as shown in Table 1 were employed in the Examples below.

TABLE 1

Compositions including the listed components in mixtures, where applicable, indicated in weight percent.

| Composition No. | Nonionic Compound | CAS No. | Wt % | Other components > 1 wt % |
|---|---|---|---|---|
| 1 | Polypropylene glycol | 25322-69-4 | 83 | |
| | Polyethylene glycol dioleate | 9005-07-6 | 5 | Petroleum distillates, oleic acid, oleate salts |
| 2 | Ethoxylated propoxylated glycerol | 9082-00-2 | 50 | Tall oil ethoxylate products |
| | Polyethylene glycol, bis-ester of tall oil acid | 61791-01-3 | 42 | |
| 3 | Ethoxylated propoxylated C14-C18 alcohols | 68154-98-3 | 99 | N/A |
| 4 | Ethoxylated propoxylated C14-C18 alcohols | 68154-98-3 | 58 | Tall oil fatty acid and salts thereof |
| | Mixed ethoxyalkanols incl. 3-ethoxy-2-methyldodecane | 78330-23-1 | 40 | |

TABLE 1-continued

| Compositions including the listed components in mixtures, where applicable, indicated in weight percent. | | | | |
|---|---|---|---|---|
| Composition No. | Nonionic Compound | CAS No. | Wt % | Other components > 1 wt % |
| 5 | Ethoxylated propoxylated C14-C18 alcohols | 68154-98-3 | 97 | Tall oil fatty acid and salts thereof |

Copper/molybdenum froth overflow was obtained from a rougher flotation of sulfide ore; and separately, the tailings underflow from the same froth flotation process was also obtained. To prepare these slurries for testing, the bulk of the material was first mixed vigorously using a handheld drill with paint mixer attachment to assure all solids were suspended, then the mixed slurry was immediately divided into 250 mL aliquots, and placed in 500 mL plastic beakers. Viscosity of each aliquot was initially measured using a Brookfield DV3T rheometer with V72 spindle, rotated at 30 RPM; measurement was done using ambient laboratory temperature conditions of 20° C.-25° C. The mixed aliquots were used immediately in the Examples as detailed below.

Example 1

Compositions 1-4 and control mixture C1 were added to the beakers containing the 250 mL aliquots of the copper/molybdenum froth overflow in amounts of 6.25 μg to 75 μg (25 μg/l to 300 μg/l) using a 100 μl pipette, then the contents of the beaker were mixed thoroughly with an immersion blender for 10 seconds. Viscosity was measured immediately after mixing to assure all solids were suspended. Results are shown in FIG. 1.

As noted in FIG. 1, Compositions 1, 2, and 3 have a notable reduction of slurry viscosity. Compositions 4 and C1 provided no reduction of viscosity. Composition 4 includes the same nonionic compound as Composition 3 but Composition 4 further includes a significant concentration, nearly half, of a nonionic compound that is not a polyol, not a surfactant, and thus also not a polyol surfactant.

Example 2

Figure 2:
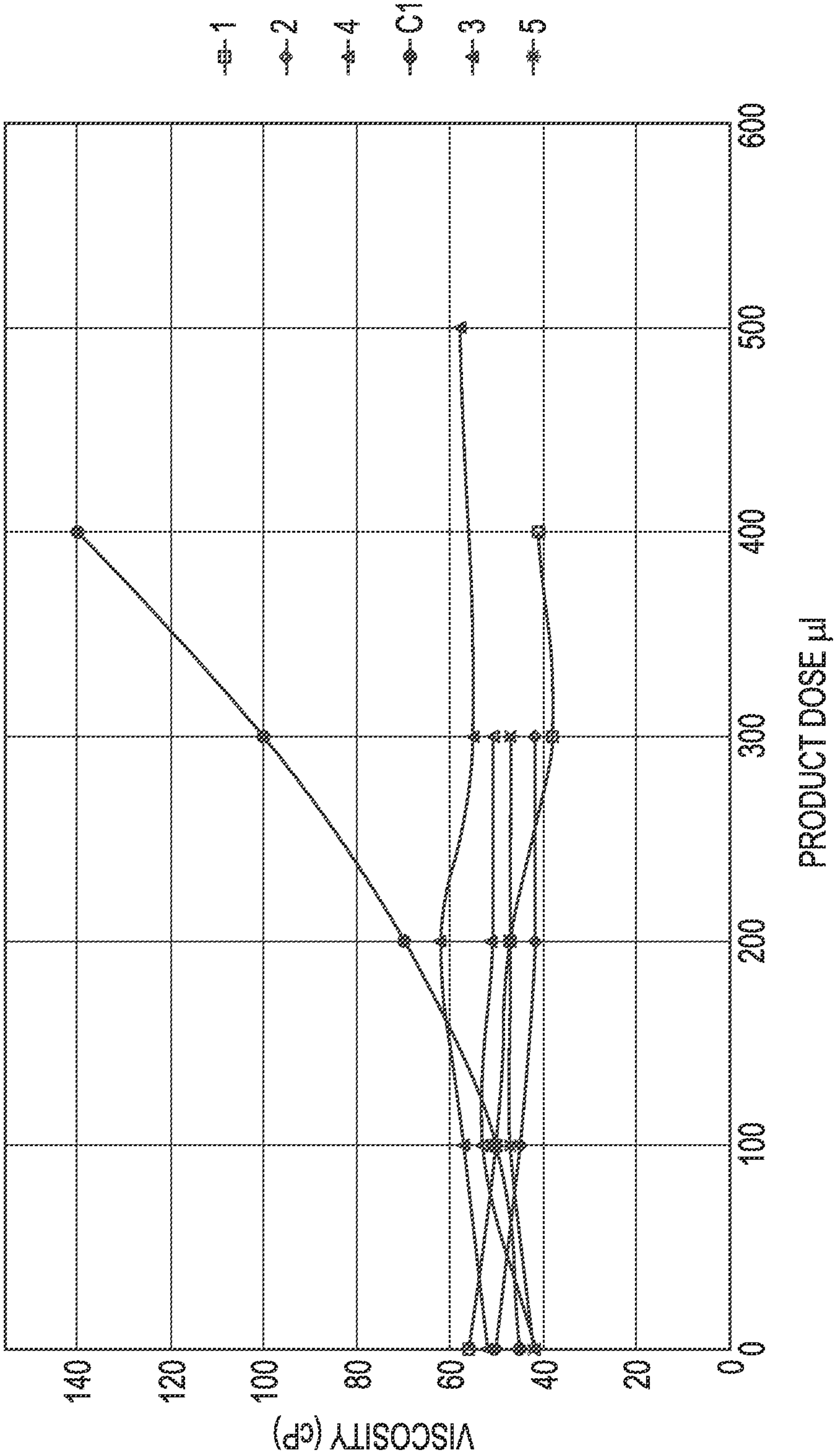
FIG. 2 is a plot of viscosity as a function of dosage for the compositions of Example 2.

Example 1 was repeated except that Compositions 1-5 and C1 were added at 25 mg to 125 mg (100 mg/l to 500 mg/l) to the tailings underflow. Results are shown in FIG. 2. As noted in FIG. 2, reduction of viscosity was measurable when applying Compositions 1 or 2 to the tailings slurry. Composition 1 reduced slurry viscosity from 56 to 50 cP (11%) at 100 micrograms per liter of slurry and reduced the viscosity further to 38 cP (32% reduction) at 300 micrograms per liter of tailings slurry. Notably, C1 addition caused viscosity of the tailings underflow to increase dramatically.

Example 3

A copper tailings slurry was formed by adding 1000 g of dry tailings from a laboratory flotation of copper-moly ore to 1 liter of water, and allowing the mixture to stand for 24 hours. The tailings slurry was remixed in bulk to ensure all solids were suspended; then the tailing slurry was divided into 500 g aliquots, which were placed in beakers. Composition 1 was added to the aliquots in amounts of 100 μg, 300 μg, and 500 μg (200 μg/l, 600 μg/l, and 1000 μg/l) using a 100 μl pipette, then the contents of the beaker were mixed thoroughly with an immersion blender for 5 seconds. The contents of the beaker were then immediately poured into an Imhoff sedimentation cone and allowed to stand for 2 hours.

Additionally, 500 ml of the tailings slurry was mixed to suspend all solids, then added to an Inhoff cone and allowed to stand for 2 hours, as a control.

Results are shown in Table 2. As can be seen in Table 2, flow time is reduced 37% by adding 200 μg/l of Composition 1 to the tailings slurry; and flow time is reduced by 46% by adding 600 μg/l of Composition 1 to the tailings slurry. It was also observed that the samples including Composition 1 had significantly less solid particulate stuck to the sides of the cone at the end of the test, indicating a cleaner separation of water and solids during sedimentation.

TABLE 2

| Time to empty Imhoff cone as a function of dosage of Composition 1 in copper tailings slurry. | |
|---|---|
| Dosage, μg/l | Flow time to empty cone, sec |
| 0 (control) | 42.07 |
| 200 | 26.53 |
| 600 | 22.65 |
| 1000 | 22.54 |

What is claimed is:

1. A method comprising collecting a sulfide overflow from a sulfide ore froth flotation process, the sulfide overflow having 20% solids or less; and adding 1 μg to 1 mg of a nonionic compound selected from a polyalkylene oxide, a structured polyol, or a polyol surfactant to each liter of the sulfide overflow to form a treated overflow, wherein the viscosity of the treated overflow is 10% to 90% less than the viscosity of the sulfide overflow.

2. The method of claim 1 wherein the treated overflow is a treated copper/moly overflow, a treated copper overflow, or a treated molybdenum overflow.

3. The method of claim 1 further comprising concentrating the treated overflow to form a treated concentrate.

4. The method of claim 3 where the concentrating is sedimentation and the method further comprises separating a supernatant from the concentrate after sedimentation.

5. A method comprising collecting a sulfide underflow from a sulfide ore froth flotation process, the sulfide underflow having 20% solids or less; and adding 1 μg to 1 mg of a nonionic compound comprising a polyalkylene oxide, a structured polyol, or a polyol surfactant to each liter of the sulfide underflow form a treated underflow, wherein the viscosity of the treated underflow is 10% to 90% less than the viscosity of the sulfide underflow.

6. The method of claim 5 wherein the treated underflow is a treated tailings underflow, a treated copper underflow, or a treated molybdenum underflow.

7. The method of claim 5 further comprising concentrating the treated underflow to form a treated concentrate.

8. The method of claim 7 where the concentrating is sedimentation and the method further comprises separating a supernatant from the concentrate after sedimentation.

9. The method of claim 1, further comprising transporting the treated overflow into a vessel and/or through a pipe.

10. The method of claim 5, further comprising transporting the treated underflow into a vessel and/or through a pipe.

11. The method of claim 1 comprising adding 1 μg to 500 μg of the nonionic compound per liter of the overflow.

12. The method of claim 5 comprising adding 1 μg to 500 μg of the nonionic compound per liter of the underflow.

13. The method of claim 1 comprising adding 10 μg to 100 μg of the nonionic compound per liter of the overflow.

14. The method of claim 5 comprising adding 10 μg to 100 μg of the nonionic compound per liter of the underflow.

* * * * *